US012604138B1

(12) United States Patent
Deschamps et al.

(10) Patent No.: US 12,604,138 B1
(45) Date of Patent: Apr. 14, 2026

(54) UNDERWATER COMMUNICATION USING SENSING FUSION

(71) Applicant: Apple Inc., Cupertino, CA (US)

(72) Inventors: Daniela M. Deschamps, Palo Alto, CA (US); David W. Robison, San Jose, CA (US); Tyler S. Atura Bushnell, San Francisco, CA (US); Christopher S. Larson, Los Altos, CA (US); Rebecca J. Russell, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 173 days.

(21) Appl. No.: 18/418,189

(22) Filed: Jan. 19, 2024

(51) Int. Cl.
H04R 1/44 (2006.01)
H04B 11/00 (2006.01)

(52) U.S. Cl.
CPC ............... H04R 1/44 (2013.01); H04B 11/00 (2013.01)

(58) Field of Classification Search
CPC .................................. H04R 1/44; H04B 11/00
See application file for complete search history.

(56) References Cited

U.S. PATENT DOCUMENTS

| | | | | |
|---|---|---|---|---|
| 2,978,669 | A | * | 4/1961 | Harris ..................... G10K 13/00 |
| | | | | 367/175 |
| 4,813,025 | A | * | 3/1989 | Rowland .............. G08B 21/088 |
| | | | | 441/89 |
| 5,105,394 | A | * | 4/1992 | Percy ........................ H04R 1/44 |
| | | | | 181/149 |
| 5,140,560 | A | * | 8/1992 | Percy ........................ H04R 1/44 |
| | | | | 367/172 |
| 5,463,598 | A | * | 10/1995 | Holland ................ B63C 9/0005 |
| | | | | 367/118 |

| | | | | |
|---|---|---|---|---|
| 6,272,072 | B1 | * | 8/2001 | Wulich ................. G01S 3/8022 |
| | | | | 73/178 R |
| 2023/0208465 | A1 | * | 6/2023 | Blom ...................... H04B 1/385 |
| | | | | 367/134 |
| 2024/0361730 | A1 | * | 10/2024 | Crowley ................ G04G 21/02 |

FOREIGN PATENT DOCUMENTS

| | | | | |
|---|---|---|---|---|
| FI | | 115749 B | * | 6/2005 |

OTHER PUBLICATIONS

"Garmin Descent Mk2i with Descent T1 GPS Watch", https://www.sportsmans.com/camping-gear-supplies/camping-tools-accessories/optics-accessories/gps-navigation-gear/gps-watches/garmin-descent-mk2i-with-descent-t1-gps-Watch/p/1742598?channel=shopping&gad_source=1&gclid=EAlaIQobChMIm4mY3dmNgwMVdV9H AR2R9ActEAQYASABEgJsB_D_BwE.

* cited by examiner

*Primary Examiner* — Daniel Pihulic
(74) *Attorney, Agent, or Firm* — Dorsey & Whitney LLP

(57) ABSTRACT

Underwater communication using sensing fusion can include one or more electronic devices. The electronic device can include a housing defining an internal volume. The electronic device can include a speaker sealed to the housing and tuned for water use (e.g., to produce/detect audible and/or sonar frequency noise underwater). The speaker can include a diaphragm configured to resonate at one or more frequencies underwater. The electronic device can include a pressure compensator associated with the speaker to compensate for hydrostatic pressure acting on the diaphragm. The speaker can include a water permeable membrane to equalize pressure underwater within the speaker, while still maintaining a seal with the housing. The speaker can include multiple seals to prevent water ingress to the internal volume. The electronic device can include another speaker for land communication (e.g., to produce/detect audible noise on land).

20 Claims, 6 Drawing Sheets

200

EXAMPLE COMMUNICATION PATHWAYS

DIVE BOAT 210

202

SONAR DETECTION OF OTHER OBJECTS

208

212

DIVER 1- WEARABLE DEVICE

240

216

218

DIVER 2- WEARABLE DEVICE

246

224

226

248

230

232

DIVER 1- DIVE TANK

DIVER 2- DIVE TANK

SONAR OR RF - - →

UNDERWATER COMMUNICATION USING SENSING FUSION

FIELD

The described embodiments relate generally to electronic devices. More particularly, the present embodiments relate to underwater communication using sensing fusion.

BACKGROUND

Wearable electronic devices (e.g., watches, trackers, etc.) typically are not designed for communication in underwater environments. For example, typical wearable electronic devices either cannot produce sound underwater or are limited in their production of sound underwater. Some wearable electronic devices also cannot communicate at all while underwater.

Therefore, a need exists in the art for underwater communication that addresses the above deficiencies or at least offers an alternative to current systems and devices. For example, a need exists for an electronic device adapted to produce sound underwater, such as frequencies suited for underwater communication between devices.

SUMMARY

Various examples of the present disclosure include an electronic device. The electronic device can include a housing defining an internal volume. The electronic device can include a speaker sealed to the housing and configured to resonate a frequency underwater. The speaker can include a diaphragm. The speaker can include a seal preventing water ingress to the internal volume. The electronic device can include a pressure compensator associated with the speaker to compensate for hydrostatic pressure acting on the diaphragm.

In one example, the pressure compensator can include active compensation coupled to the diaphragm to resist water pressure applied to the diaphragm. The active compensation can include an electromagnet configured to provide a force resisting the water pressure. In one example, the pressure compensator can include a water permeable membrane allowing water to flow across the diaphragm to equalize pressure across opposing sides of the diaphragm. The seal can prevent water ingress from a wet side of the diaphragm to the internal volume. In one example, the electronic device can include a deformable member and a transducer coupled to the deformable member to selectively vibrate the deformable member to generate noise. The deformable member can be a display of the electronic device. In one example, the speaker can be configured to generate sonar frequencies to locate objects near the electronic device. In one example, the speaker can be configured to detect radiofrequency or sonar signals emitted from another electronic device underwater. In one example, the speaker can be a first speaker, and the electronic device can include a second speaker configured to propagate sound through air.

Various examples of the present disclosure include a speaker transducer for a wearable electronic device. The speaker transducer can include a diaphragm configured to resonate at one or more frequencies underwater. The speaker transducer can include multiple seals configured to prevent water ingress to a device interior of the wearable electronic device.

In one example, the speaker transducer can include a chassis. The multiple seals can include a first seal configured to seal the chassis to a housing of the wearable electronic device, and a second seal configured to prevent water ingress from a wet side of the diaphragm. In one example, the multiple seals can include a first seal and a second seal. The diaphragm can include the first seal. The second seal can be configured to seal a chassis of the speaker transducer to a housing of the wearable electronic device. In one example, diaphragm can include a wet side and a dry side. The speaker transducer can include active compensation coupled to the diaphragm to resist water pressure applied to the diaphragm. The active compensation can be positioned on the dry side to push towards the wet side. The active compensation can include an electromagnet. In one example, the diaphragm can include a water permeable membrane allowing water to flow across the diaphragm to equalize pressure across opposing sides of the diaphragm. The water permeable membrane can define a flow rate across the opposing sides of the diaphragm, with the flow rate tailored based on the one or more frequencies.

Various examples of the present disclosure include a speaker system for an electronic device. The speaker system can include a first speaker configured to propagate sound through air, and a second speaker configured to resonate a frequency underwater. The second speaker can include a diaphragm. The second speaker can include a seal preventing water ingress to an interior of the electronic device.

In one example, the first speaker can be configured to produce audible noise on land. The second speaker can be configured to produce audible and sonar frequency noise underwater. In one example, the second speaker can be configured to detect radiofrequency or sonar signals emitted from another electronic device underwater.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to underwater communication using sensing fusion. An underwater speaker can be used for notification alerts, radiofrequency (RF) communication, or sonar communication, among other communication. The sonar application of the speaker can be used to transmit information to other underwater users, to equipment (e.g., a dive tank), to boats (e.g., a dive boat), and/or to locate objects at close range underwater (e.g., a nearby shark, spearfishing prey, etc.). The underwater speaker can also be used to sound alarms or alerts to notify a diver. Specifically tuned speaker transducers can be used to detect sonar signals from other nearby devices or emitters (e.g., to receive info from a dive tank).

The underwater speaker can be optimized for water pressure. By optimizing the transducer design through any of the systems described herein, the underwater speaker can be tuned to produce audible and sonar frequency noise underwater. A speaker system can include multiple speakers optimized for different functionalities. One example includes a primary speaker for land communication (i.e. communication outside the water or through air, to propagate sound through air, etc.), and a secondary speaker tuned for water use (i.e., to resonate a frequency underwater). A transducer (e.g., a piezoelectric transducer) can be coupled to an electronic display or another flat surface that can resonate to create sound effectively underwater.

These and other embodiments are discussed below with reference to FIGS. 1-5. However, those skilled in the art will readily appreciate that the detailed description given herein with respect to these figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1A:
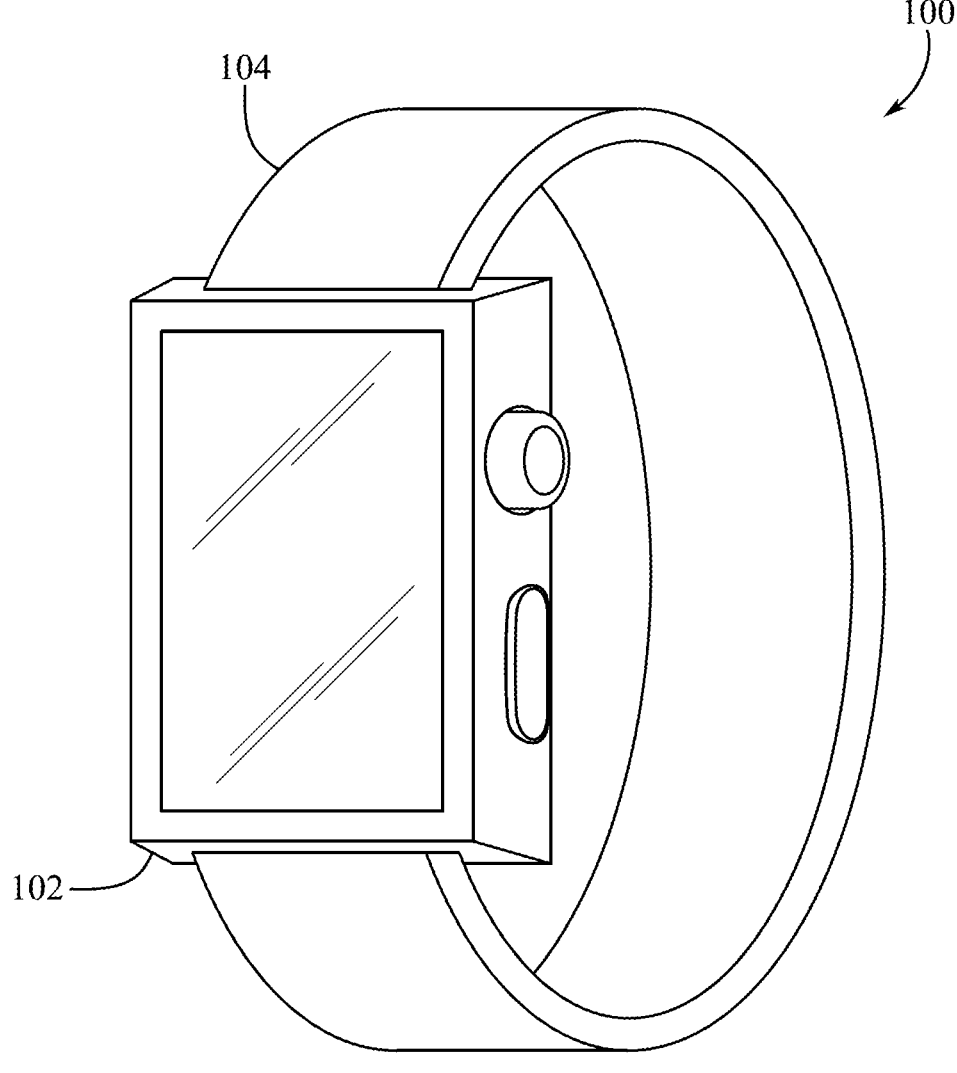
FIG. 1A shows an example of a wearable electronic device.

FIG. 1A shows an example of an electronic device 100. The electronic device 100 shown in FIG. 1A is a watch, such as a smartwatch. The smartwatch of FIG. 1A is merely one representative example of a device that can be used in conjunction with the systems and methods disclosed herein. Electronic device 100 can correspond to any form of wearable electronic device, a portable media player, a media storage device, a portable digital assistant ("PDA"), a tablet computer, a computer, a mobile communication device, a GPS unit, a remote control device, or other electronic device. The electronic device 100 can be referred to as an electronic device, or a consumer device. In some examples, the electronic device 100 can include a housing 102 that can carry operational components, for example, in an internal volume at least partially defined by the housing. The electronic device 100 can also include a strap 104, or other retaining component that can secured the device 100 to a body of a user as desired. Further details of the electronic device are provided below with reference to FIG. 1B.

Figure 1B:
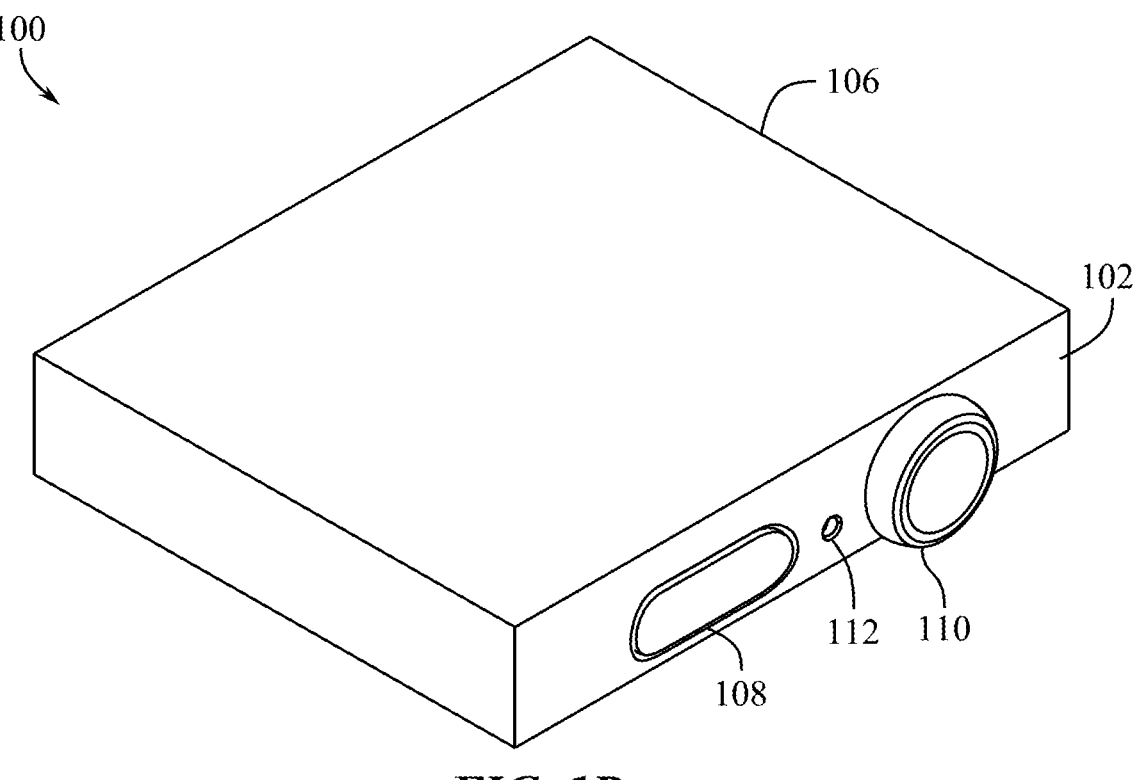
FIG. 1B shows a top view of a portion of the wearable electronic device.

FIG. 1B illustrates the electronic device 100, for example a smartwatch, that can be substantially similar to, and can include some or all of, the features of the devices described herein, including the electronic device 100 shown in FIG. 1A but without the strap 104. The device 100 can include a housing 102, and a display assembly 106 attached to the housing 102. The housing 102 can substantially define at least a portion of an exterior surface of the device 100.

The display assembly 106 can include a glass, a plastic, a ceramic such as sapphire, or any other substantially transparent exterior layer, material, component, or assembly. The display assembly 106 can include multiple layers, with each layer providing a unique function, as described herein. Accordingly, the display assembly 106 can be, or can be a part of, an interface component. The display assembly 106 can define a front exterior surface of the device 100 and, as described herein, this exterior surface can be considered an interface surface. In some examples, the interface surface defined by display assembly 106 can receive inputs, such as touch inputs, from a user.

In some examples, the housing 102 can be a substantially continuous or unitary component and can define one or more openings to receive components of the electronic device 100. In some examples, the electronic device 100 can include input components such as one or more buttons 108 and/or a crown 110 that can be disposed in the openings. In some examples, a material can be disposed between the buttons 108 and/or crown 110 and the housing 102 to provide an airtight and/or watertight seal at the locations of the openings. The housing 102 can also define one or more openings or apertures, such as aperture 112 that can allow for sound to pass into or out of the internal volume defined by the housing 102. For example, the aperture 112 can be in communication with a sensor such as a microphone component disposed in the internal volume. In some examples, one or multiple apertures 112 can be in communication with a speaker component disposed in the internal volume. In some examples, the housing 102 can define or include a feature, such as an indentation, to removably couple the housing 102 and a strap or retaining component.

Figure 1C:
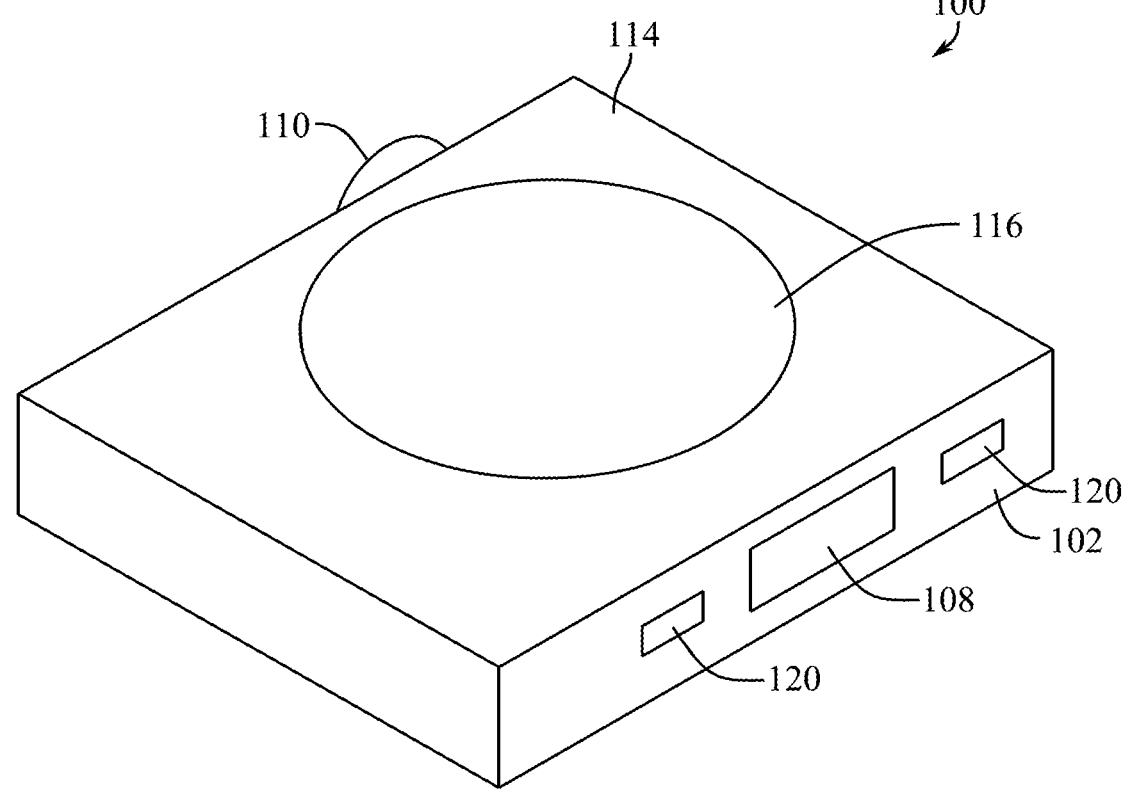
FIG. 1C shows a bottom view of a portion of the wearable electronic device.

FIG. 1C shows a bottom perspective view of the electronic device 100. The device 100 can include a back cover 114 that can be attached to the housing 102, for example, opposite the display assembly 106. The back cover 114 can include ceramic, plastic, metal, or combinations thereof. In some examples, the back cover 114 can include an at least partially electromagnetically transparent component 116. The electromagnetically transparent component 116 can be transparent to any desired wavelengths of electromagnetic radiation, such as visible light, infrared light, radio waves, or combinations thereof. In some examples, the electromagnetically transparent component 116 can allow sensors and/or emitters disposed in the housing 102 to communicate with the external environment. Together, the housing 102, display assembly 106 and back cover 114 can substantially define an internal volume and an external surface of the device 100.

In some examples, the electronic device 100 can include one or more sensors 120. The electronic device 100 shown in FIG. 1C includes multiple sensors 120. However, the embodiment illustrated in FIG. 1C is merely one representative example, and the electronic device 100 can include any number of sensors 120, including a single sensor 120 or more than two sensors 120. The sensors 120 can be configured to detect a surrounding environmental characteristic. For example, one or more sensors 120 can detect a barometric pressure, an altitude, the presence of water or fluid, or an underwater depth, among other characteristics. In such examples, the one or more sensors 120 can include a depth sensor, an altimeter, a pressure sensor, or the like.

Any of the features, components, and/or parts, including the arrangements and configurations thereof shown in FIGS. 1A-1C can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIGS. 1A-1C.

As noted above, portable and wearable electronic devices can be designed to be used in many different environments and during any kind of activity throughout a user's day. For example, wearable electronic watches, headphones, and phones can be carried by a user during exercise, sleep, driving, biking, hiking, swimming, diving, outside in the rain, outside in the sun, and so forth. Wearable electronic devices described herein are configured to withstand the varied and often harsh conditions of various environments, including changing environments and wet environments. Wet environments can include wearing devices in the rain or when submerged during bathing, swimming, diving, or other water sports, for example.

Examples of electronic devices disclosed herein include components, features, arrangements, and configurations that facilitate use under different environments. For example, electronic devices disclosed herein include components, features, arrangements, and configurations that maintain use of the device under water, such as while diving at depth below the water's surface. In some examples, electronic devices disclosed herein include speaker transducer configurations that compensate for hydrostatic pressure, such as to permit underwater communication.

Figure 2:
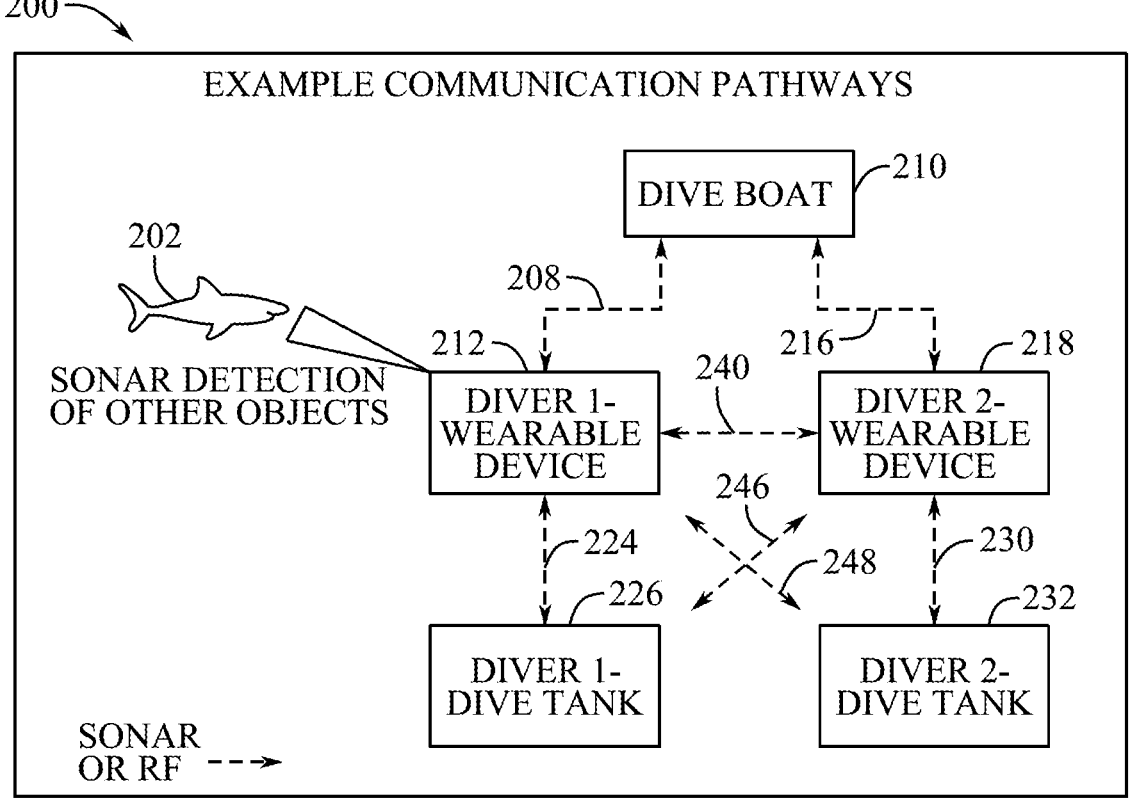
FIG. 2 shows example pathways for underwater communication.

Along these lines, FIG. 2 shows example pathways for underwater communication. As shown, multiple devices (e.g., boats, tanks, accessories, etc.) and/or users (e.g., divers) can communicate with each other (e.g., via one or more communication pathways) while diving, snorkeling, swimming, etc. For example, one or more electronic devices can provide an underwater communication system 200 using acoustic, radiofrequency (RF), and other components, as detailed below. The electronic device(s) can be used for notification alerts, sonar communication, etc. In such embodiments, a sonar application of the electronic device(s) can be used to transmit information to other underwater users, to equipment, to boats, to locate objects at close range (e.g., wildlife 202, such as sharks, spearfishing prey, coral reef fish, etc.), or the like, as detailed below. An underwater-capable speaker can be used to play alarms or alerts to notify a diver. Underwater-capable microphones or specifically tuned speaker transducers can be used to detect sonar signals from other nearby devices or emitters. RF signals can also be used for communication between devices at close range.

As shown, a first communication pathway 208 can be established between a boat 210 and a first electronic device 212 (e.g., associated with a first diver). A second communication pathway 216 can be established between the boat 210 and a second electronic device 218 (e.g., associated with a second diver). Additional communication pathways can be established between the boat 210 and other divers, such as separate pathways between the boat 210 and an electronic device associated with each diver. The first communication pathway 208 can allow data or other information to be transmitted between the boat 210 and the first electronic device 212. Similarly, the second communication pathway 216 can allow data or other information to be transmitted between the boat 210 and the second electronic device 218. Examples of data communicated over the first communication pathway 208 and/or the second communication pathway 216 include location information, dive statistics, timing information, alerts, equipment status, biometric data, health sensing, team monitoring, navigation, or any other information relevant to the user/diver.

With continued reference to FIG. 2, a third communication pathway 224 can be established between the first electronic device 212 and the diver's equipment (e.g., a first dive tank 226). Similarly, a fourth communication pathway 230 can be established between the second electronic device 218 and the diver's equipment (e.g., a second dive tank 232). The third communication pathway 224 can allow equipment data or other information to be transmitted to the first electronic device 212. The fourth communication pathway 230 can allow equipment data or other information to be transmitted to the second electronic device 218. Examples of data communicated over the third communication pathway 224 and/or the fourth communication pathway 230 include equipment status, tank pressure, etc.

As shown, additional pathways can be created for further communication. For example, a fifth communication pathway 240 can be created between the first electronic device 212 and the second electronic device 218, such as to provide communication between divers. The first dive tank 226 can communicate with the second electronic device 218 via a sixth communication pathway 246, and the second dive tank 232 can communicate with the first electronic device 212 via a seventh communication pathway 248. In this manner, each diver can see the equipment status or location of all divers within the group. In addition, the boat 210 (e.g., users, trainers, or dive masters on the boat 210) can see the equipment status and location of all divers within the group, as well as communicate to the dive group as a whole or individually.

In this manner, the multiple devices of the underwater communication system 200 can provide sensor fusion. For example, data derived from disparate devices (e.g., the first electronic device 212, the second electronic device 218, the first dive tank 226, the second dive tank 232, the boat 210, existing third-party sensors or modules, etc.) can be combined such that the resulting information has less uncertainty than would be possible when the devices are used individually. Additionally, or alternatively, combining data from the various devices of the underwater communication system 200 can build a unified view of the underwater environment, the dive team, etc.

Any of the features, components, and/or parts, including the arrangements and configurations thereof shown in FIG. 2 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 2.

Figure 3:
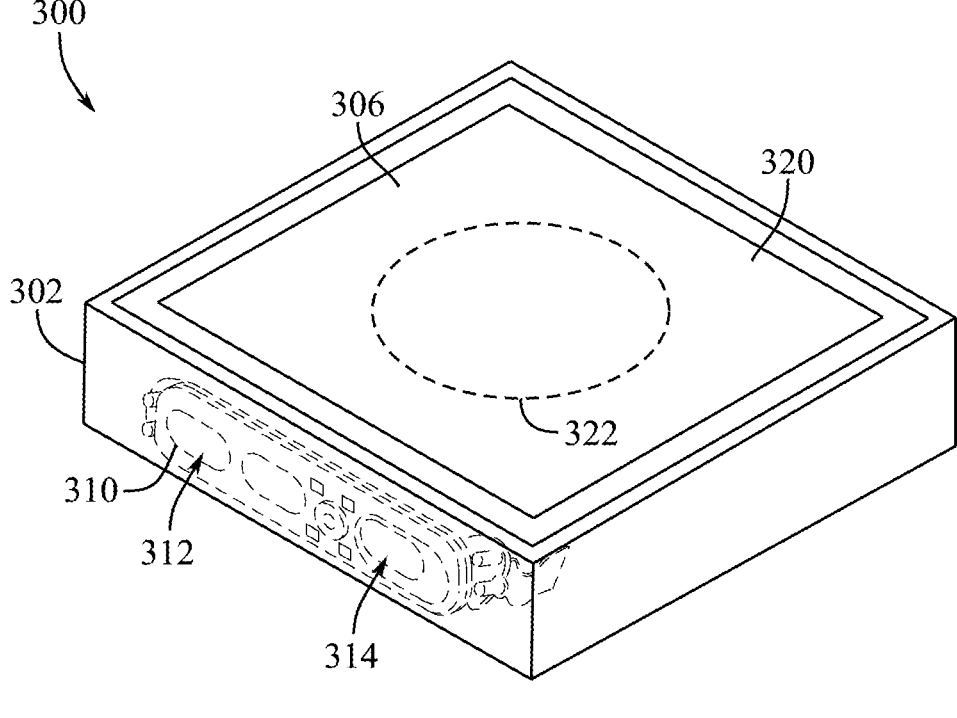
FIG. 3 shows a perspective view of a wearable electronic device.

FIG. 3 shows a perspective view of a wearable electronic device 300 (e.g., first electronic device 212, second electronic device 218, etc., described above). The electronic device 300 can include various features allowing land and underwater communication. As shown, the electronic device 300 can include a housing 302 and a display assembly 306 (e.g., similar to housing 102 and display assembly 106 described above). The electronic device 300 can include a speaker system 310, such as coupled to or within the housing 302. The speaker system 310 can include one or more speakers or speaker transducers, such as a first speaker 312 and a second speaker 314. The first speaker 312 can be tuned for land use or communication. For example, the first speaker 312 can be configured to produce audible noise on land or outside of the water (e.g., to propagate sound through air), such as frequencies between 20 Hz and 20 kHz audible to the human ear.

The second speaker 314 can be tuned for water use (i.e., to resonate a frequency underwater). For example, the second speaker 314 can be configured to produce audible and sonar frequency noise underwater. The audible and sonar frequencies can be used to communicate information underwater, such as described above with reference to FIG. 2. For example, the second speaker 314 can also be configured detect RF or sonar signals emitted from another electronic device underwater, such as described above with reference to FIG. 2. In embodiments, the sonar frequencies can be used to detect or otherwise locate objects (e.g., wildlife 202) near the electronic device 300.

Portions of the electronic device 300 can resonate to generate noise underwater. For example, the electronic device 300 can include a deformable member 320. The deformable member 320 can be a flat surface that can resonate to create sound effectively underwater. In examples, the deformable member 320 may be the display assembly 306, although other configurations are contemplated. The electronic device 300 can include a transducer 322 coupled to the deformable member 320 to selectively vibrate the deformable member 320 to generate noise. For example, the transducer 322 can vibrate the deformable member 320 to create sound waves for communication (e.g., sonar sound waves, etc.). In examples, the transducer 322 is a piezoelectric transducer, although other configurations are contemplated.

Any of the features, components, and/or parts, including the arrangements and configurations thereof shown in FIG. 3 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 3.

Figure 4:
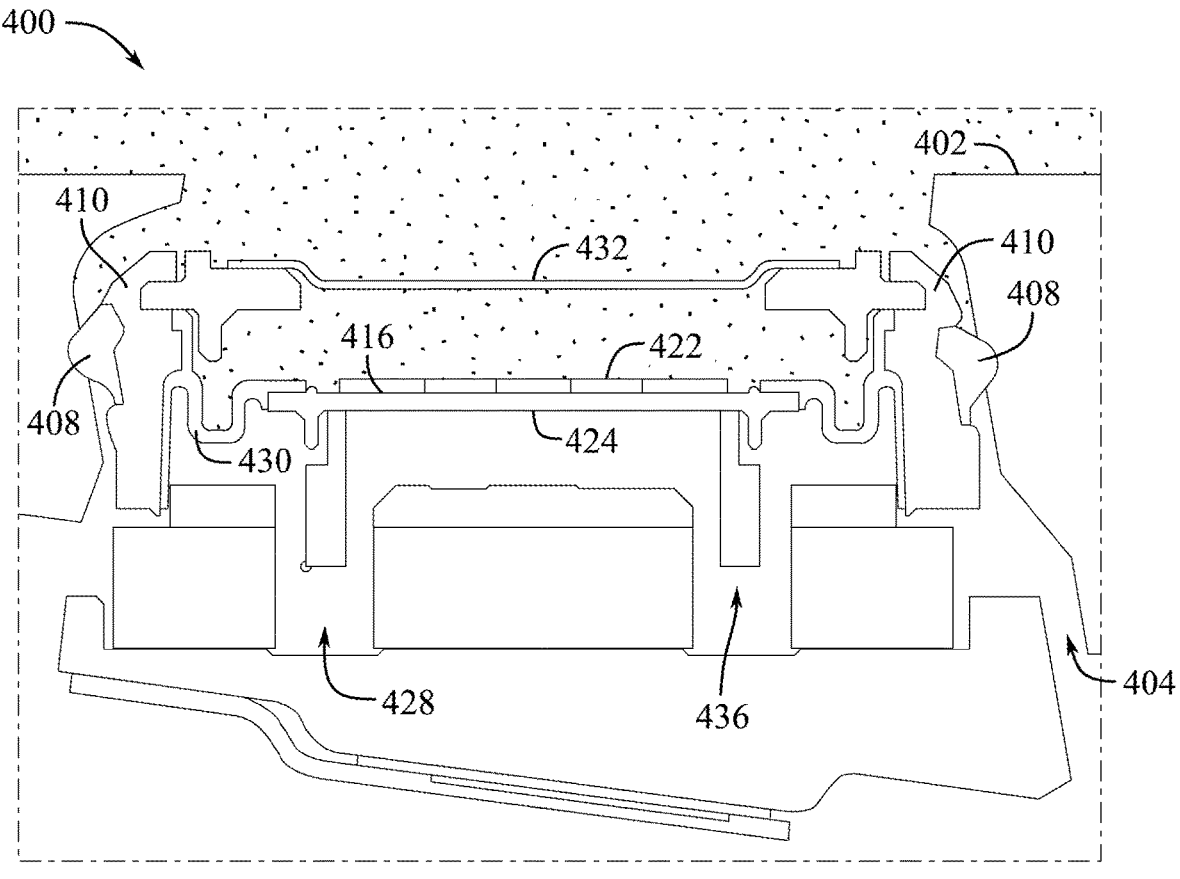
FIG. 4 shows a schematic view of a speaker transducer design.

FIG. 4 shows a schematic view of a first speaker transducer 400 for a wearable electronic device (e.g., any of electronic devices described above). The first speaker transducer 400 may embody the second speaker 314 described above to produce and/or detect audible and/or sonar frequency noise underwater. As shown, the electronic device can include a housing 402 defining an internal volume 404. The first speaker transducer 400 can be sealed to the housing 402. For example, one or more seals (e.g., seal 408) can be positioned between the housing 402 and a chassis 410 of the first speaker transducer 400 to prevent water ingress to the internal volume 404.

The first speaker transducer 400 can include a diaphragm 416 configured to resonate at one or more frequencies underwater. For example, the diaphragm 416 can resonate at a sonar frequency, such as to provide or receive RF and/or sonar communication, as described above. The diaphragm 416 can include opposing sides, such as a first side 422 and a second side 424. The first side 422 may be a wet side of the diaphragm 416. For example, the first side 422 may be fluidly coupled to the wet environment. The second side 424 may be a dry side of the diaphragm 416. For example, the second side 424 may be sealed against water ingress. In such examples, the diaphragm 416 can define a seal preventing water ingress to a device interior 428. In this manner, water can be contained on the outside of the first speaker transducer 400 only.

The diaphragm 416 can be coupled to a suspension 430. The suspension 430 can be flexible to allow movement of the diaphragm 416. The suspension 430 can be robust to hold against the water pressure on the first side 422 of the diaphragm 416. For example, the suspension 430 can have increased strength and/or resilience compared conventional speaker designs. For example, the suspension 430 can include a stiffer shore hardness, bigger magnets, a bigger voice coil, etc. compared to conventional speaker designs. The suspension 430 can seal against water ingress to the device interior 428. For example, the suspension 430 can be coupled to the chassis 410 to seal against water ingress to the device interior 428.

The first speaker transducer 400 can include a grill 432. The grill 432 can be mounted to the chassis 410 in a position to protect the diaphragm 416 and/or other components of the first speaker transducer 400. The grill 432 can provide a sound characteristic for the first speaker transducer 400. For example, the grill 432 can include one or more apertures (e.g., ports, slits, etc.) to tailor the sound/noise produced by the first speaker transducer 400, such as tailoring the propagation direction, shape, etc. of the sound/noise produced by the first speaker transducer 400. In other examples, the grill 432 can facilitate an omnidirectional or near-omnidirectional sound/noise characteristic of the first speaker transducer 400.

The electronic device 100 can include a pressure compensator associated with the first speaker transducer 400 to compensate for hydrostatic pressure acting on the diaphragm 416. For example, the first speaker transducer 400 can include active compensation 436. The active compensation 436 can be coupled to the diaphragm 416 to resist water pressure applied to the diaphragm 416. For example, the active compensation 436 can be positioned on the dry side to push towards the wet side. The active compensation 436 can include an electromagnet configured to resist the water pressure. The electromagnet can be defined by a speaker coil or another device.

Any of the features, components, and/or parts, including the arrangements and configurations thereof shown in FIG. 4 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 4.

Figure 5:
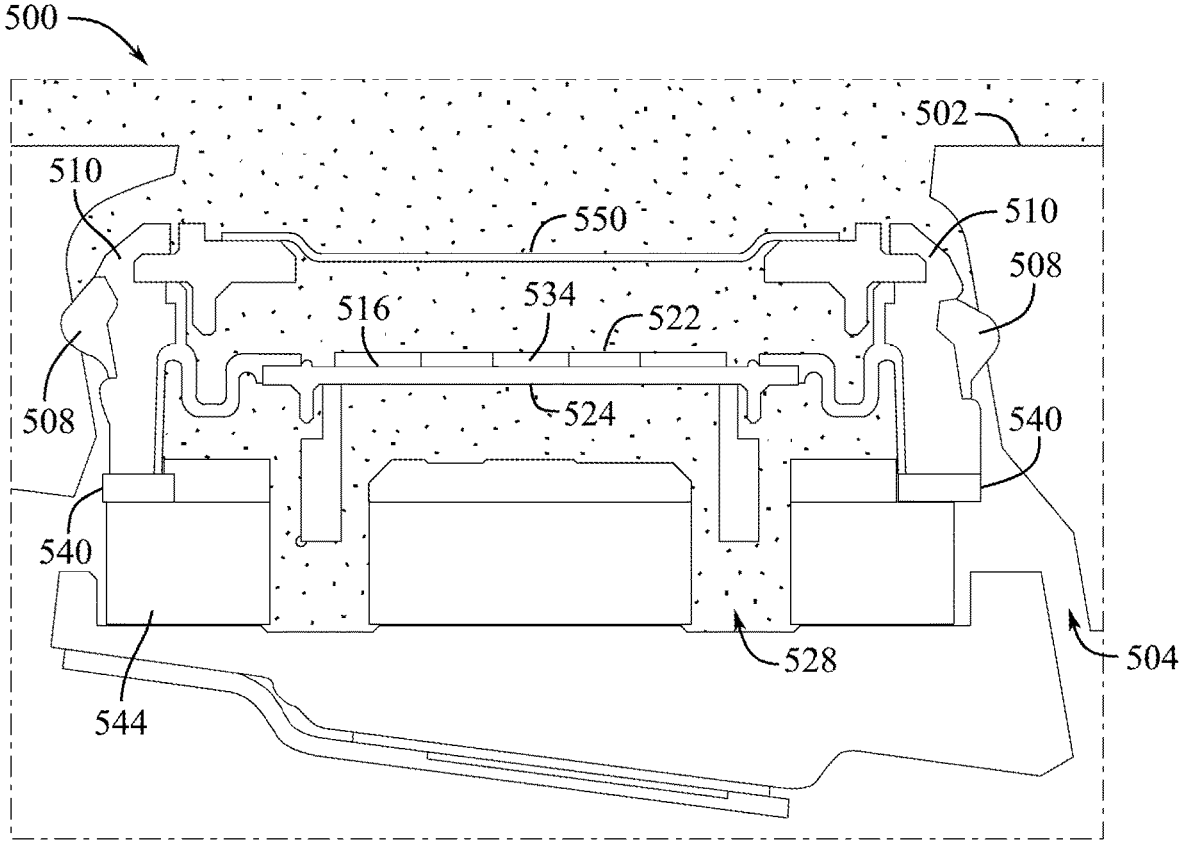
FIG. 5 shows a schematic view of another speaker transducer design.

FIG. 5 shows a schematic view of a second exemplary speaker transducer 500 for a wearable electronic device (e.g., any of electronic devices described above). The second speaker transducer 500 may embody the second speaker 314 described above to produce and/or detect audible and/or sonar frequency noise underwater. As shown, the electronic device can include a housing 502 defining an internal volume 504. The second speaker transducer 500 can be sealed to the housing 502. For example, one or more seals (e.g., seal 508) can be positioned between the housing 502 and a chassis 510 of the second speaker transducer 500 to prevent water ingress to the internal volume 504.

The second speaker transducer 500 can include a diaphragm 516 configured to resonate at one or more frequencies underwater. For example, the diaphragm 516 can resonate at a sonar frequency, such as to provide or receive RF and/or sonar communication, as described above. The diaphragm 516 can include opposing sides, such as a first side 522 and a second side 524. Each of the first side 522 and the second side 524 can be a wet side of the diaphragm 516. For example, each of the first side 522 and the second side 524 can be fluidly coupled to the wet environment. In such examples, an interior 528 of the second speaker transducer 500 may be filled with fluid.

A pressure compensator associated with the second speaker transducer 500 may compensate for hydrostatic pressure acting on the diaphragm 516. For example, the diaphragm 516 can include a water permeable membrane 534. The water permeable membrane 534 can allow water to flow across the diaphragm 516 to equalize pressure across the first side 522 and the second side 524 of the diaphragm 516, while still maintaining a watertight seal between the two sides. The water permeable membrane 534 can define a flow rate across the opposing sides of the diaphragm 516. The flow rate can be tailored based on the one or more frequencies at which the diaphragm 516 is to resonate. For example, the flow rate can be tailored for optimal acoustic performance. As one example, the water permeable membrane 534 can limit water throughput, such that the vibrations of the diaphragm 516 are not affected significantly. In this manner, the water permeable membrane 534 can provide a "slow fill" characteristic to maintain or otherwise facilitate a desired frequency generation.

The second speaker transducer 500 can include a second seal 540 preventing water ingress to an interior of the electronic device, such as to the internal volume 504. The second seal 540 can prevent water ingress from a wet side of the diaphragm 516 (e.g., the second side 524) to the internal volume 504. The second seal 540 can be positioned between the second speaker transducer 500 and a mounting structure of the electronic device. Additionally, or alternatively, the second seal 540 can be positioned between components of the second speaker transducer 500 (e.g., between separate chassis of the second speaker transducer 500, between the chassis 510 and a magnet 544 of the second speaker transducer 500, etc.).

The second speaker transducer 500 can include a grill 550. The grill 550 can be mounted to the chassis 510 in a position to protect the diaphragm 516 and/or other components of the second speaker transducer 500. The grill 550 can provide a sound characteristic for the second speaker transducer 500. For example, the grill 550 can include one or more apertures (e.g., ports, slits, etc.) to tailor the sound/noise produced by the second speaker transducer 500, such as tailoring the propagation direction, shape, etc. of the sound/noise produced by the second speaker transducer 500. In other examples, the grill 550 can facilitate an omnidirectional or near-omnidirectional sound/noise characteristic of the second speaker transducer 500.

Although speaker transducers are shown and described, a water-optimized microphone can be tuned to "listen" for underwater communication, such as a sonar signal from a dive tank, another diver, or an object being located. In addition, RF components, such as an antenna, can emit and detect RF signals, such as in the Ultra-Wide band range, to communicate over short distances between devices. In addition, although sonar and other frequency communication is described, the electronic devices disclosed herein can emit other frequencies for other purposes. For example, the electronic devices disclosed herein can emit frequencies to deter animal attacks or provide a siren. In addition, or alternatively, the electronic devices disclosed herein can emit an attractive signal, such as frequencies that draw in wildlife 202 (e.g., small, colorful fish while snorkeling, etc.).

Any of the features, components, and/or parts, including the arrangements and configurations thereof shown in FIG. 5 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 5.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A wearable electronic device comprising:
a housing defining an internal volume;
a speaker sealed to the housing and configured to resonate a frequency underwater, the speaker comprising:
a diaphragm; and
a seal preventing water ingress to the internal volume; and
a pressure compensator associated with the speaker to compensate for hydrostatic pressure acting on the diaphragm.

2. The electronic device of claim 1, wherein the pressure compensator comprises active compensation coupled to the diaphragm to resist water pressure applied to the diaphragm.

3. The electronic device of claim 2, wherein the active compensation comprises an electromagnet configured to provide a force resisting the water pressure.

4. The electronic device of claim 1, wherein the pressure compensator comprises a water permeable membrane allowing water to flow across the diaphragm to equalize pressure across opposing sides of the diaphragm.

5. The electronic device of claim 4, wherein the seal prevents water ingress from a wet side of the diaphragm to the internal volume.

6. The electronic device of claim 1, further comprising:
a deformable member; and
a transducer coupled to the deformable member to selectively vibrate the deformable member to generate noise.

7. The electronic device of claim 6, wherein the deformable member is a display of the electronic device.

8. The electronic device of claim 1, wherein the speaker is configured to generate a sonar frequency to locate objects near the electronic device.

9. The electronic device of claim 1, wherein the speaker is configured to detect signals emitted from another electronic device underwater.

10. The electronic device of claim 1, further comprising:
wherein the speaker is a first speaker; and
a second speaker configured to propagate sound through air.

11. A speaker transducer for a wearable electronic device, the speaker transducer comprising:
a diaphragm configured to resonate a frequency underwater; and
multiple seals configured to prevent water ingress to a device interior of the wearable electronic device;
wherein the speaker transducer is configured to resist changes in water pressure.

12. The speaker transducer of claim 11, further comprising a chassis, wherein the multiple seals comprise:
a first seal configured to seal the chassis to a housing of the wearable electronic device; and
a second seal configured to prevent water ingress from a wet side of the diaphragm.

13. The speaker transducer of claim 11, wherein:
the multiple seals comprise a first seal and a second seal;
the diaphragm comprises the first seal; and
the second seal is configured to seal a chassis of the speaker transducer to a housing of the wearable electronic device.

14. The speaker transducer of claim 11, further comprising:
wherein the diaphragm comprises a wet side and a dry side; and an active compensation coupled to the diaphragm to resist water pressure applied to the diaphragm, the active compensation positioned on the dry side to push towards the wet side.

15. The speaker transducer of claim 14, wherein the active compensation comprises an electromagnet.

16. The speaker transducer of claim 11, wherein the diaphragm comprises a water permeable membrane allowing water to flow across the diaphragm to equalize pressure across opposing sides of the diaphragm.

17. The speaker transducer of claim 16, wherein the water permeable membrane defines a flow rate across the opposing sides of the diaphragm, with the flow rate tailored based on the one or more frequencies.

18. A speaker system for a wearable electronic device, the speaker system comprising:

a first speaker configured to propagate sound through air; and a second speaker configured to resonate a frequency underwater, the second speaker comprising:

a diaphragm; and a seal preventing water ingress to an interior of the electronic device;

wherein the second speaker is configured to resist changes in water pressure.

19. The speaker system of claim 18, wherein:

the first speaker is configured to produce audible noise on land; and the second speaker is configured to produce audible and sonar frequency noise underwater.

20. The speaker system of claim 18, wherein the second speaker is configured to detect radiofrequency or sonar signals emitted from another electronic device underwater.

\* \* \* \* \*